(12) United States Patent
Seibert et al.

(10) Patent No.: US 11,592,595 B2
(45) Date of Patent: Feb. 28, 2023

(54) SYSTEMS AND METHODS FOR DETERMINING, BROADCASTING AND USING REFERENCE ATMOSPHERIC DATA IN A NETWORK OF TRANSMITTERS

(71) Applicant: NextNav, LLC, Sunnyvale, CA (US)

(72) Inventors: Cristina Seibert, Mountain View, CA (US); Jerome Vogedes, Milwaukee, WI (US); William Alberth, Jr., Prairie Grove, IL (US)

(73) Assignee: NextNav, LLC, Sunnyvale, CA (US)

( * ) Notice: Subject to any disclaimer, the term of this patent is extended or adjusted under 35 U.S.C. 154(b) by 368 days.

(21) Appl. No.: 15/930,315

(22) Filed: May 12, 2020

(65) Prior Publication Data
US 2021/0018656 A1 Jan. 21, 2021

Related U.S. Application Data

(60) Provisional application No. 62/874,811, filed on Jul. 16, 2019.

(51) Int. Cl.
*G01W 1/06* (2006.01)
*G01W 1/10* (2006.01)
(Continued)

(52) U.S. Cl.
CPC .............. *G01W 1/10* (2013.01); *G01S 5/0063* (2013.01); *G01S 5/0284* (2013.01); *G01W 1/06* (2013.01);
(Continued)

(58) Field of Classification Search
None
See application file for complete search history.

(56) References Cited

U.S. PATENT DOCUMENTS 9,952,354 B2 4/2018 Springer
9,980,246 B2 * 5/2018 Pattabiraman ....... H04B 7/0697
(Continued)

FOREIGN PATENT DOCUMENTS

EP 3399277 A1 * 11/2018

OTHER PUBLICATIONS

Form PCT/ISA/220, PCT/US2020/032533, "Notification of Transmittal", 1 page(s); Form PCT/ISA/210, PCT/US2020/032533, "International Search Report", 3 page(s); EPO Form P04A42, PCT/US2020/032533, "Information on Search Strategy", 1 page(s); Form PCT/ISA/237, PCT/ US2020/032533, "Written Opinion of the International Searching Authority", 6 page(s); dated Sep. 8, 2020.

*Primary Examiner* — Ajit Patel
(74) *Attorney, Agent, or Firm* — MLO, a professional corp.

(57) ABSTRACT

Determining, broadcasting and using reference pressure data in a network of transmitters. Particular embodiments described herein include machines that select atmospheric data from weather stations within a transmitter network, use the selected atmospheric data to determine a reference atmospheric value, and transmit the reference atmospheric value from a transmitter to a mobile device for use in estimating an altitude of the mobile device. The atmospheric data may include any of reference pressures form the weather stations, measured temperatures from the weather stations, or reference temperatures from the weather stations. The reference atmospheric value may include a reference pressure value of a reference altitude, or a reference temperature value.

17 Claims, 12 Drawing Sheets

(51) Int. Cl.
  *H04W 4/029* (2018.01)
  *G01S 5/00* (2006.01)
  *G01S 5/02* (2010.01)
  *H04H 60/71* (2008.01)
  *H04W 4/02* (2018.01)

(52) U.S. Cl.
  CPC ............ *H04H 60/71* (2013.01); *H04W 4/025* (2013.01); *H04W 4/029* (2018.02)

(56) References Cited

U.S. PATENT DOCUMENTS

| | | |
|---|---|---|
| 10,367,932 B1 | 7/2019 | Zhu |
| 2012/0265373 A1* | 10/2012 | Ingvalson ................ G01C 5/06 701/4 |
| 2014/0135040 A1 | 5/2014 | Edge |
| 2014/0174175 A1 | 6/2014 | Chun |
| 2016/0033286 A1 | 2/2016 | Gemelli |
| 2016/0047648 A1* | 2/2016 | Edge ........................ G01C 5/06 73/384 |
| 2016/0047649 A1 | 2/2016 | Edge |
| 2018/0094998 A1* | 4/2018 | Youssef ................. G01L 13/06 |

\* cited by examiner

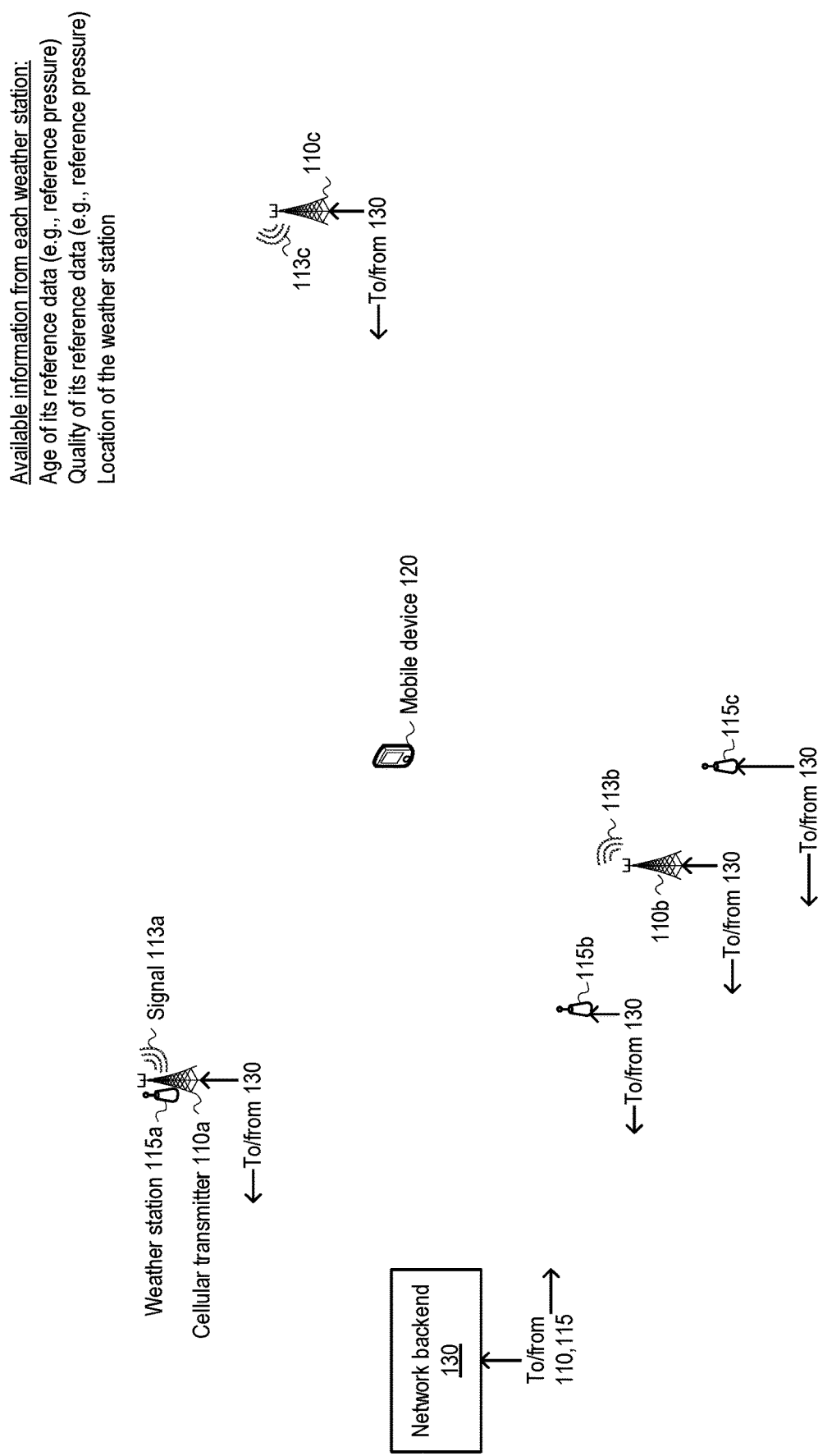

Transmitter

*Transmitter*

Coverage area

*Coverage area of transmitter*

*Sub-cells*

*Cell sectors*

Beam

*Beam of transmitter*

Area

Direction

*Area along direction of transmission*

SYSTEMS AND METHODS FOR DETERMINING, BROADCASTING AND USING REFERENCE ATMOSPHERIC DATA IN A NETWORK OF TRANSMITTERS

BACKGROUND

Determining the exact location of a mobile device (e.g., a smart phone operated by a user) in an environment can be quite challenging, especially when the mobile device is located in an urban environment or is located within a building. Imprecise estimates of the mobile device's altitude, for example, may have life or death consequences for the user of the mobile device since the imprecise altitude estimate can delay emergency personnel response times as they search for the user on multiple floors of a building. In less dire situations, imprecise altitude estimates can lead a user to the wrong area in an environment.

Different approaches exist for estimating an altitude of a mobile device. In a barometric-based positioning system, altitude can be computed using a measurement of pressure from a calibrated pressure sensor of a mobile device along with ambient pressure measurement(s) from a network of calibrated weather stations and a measurement of ambient temperature from the network or other source. An estimate of an altitude of a mobile device ($h_{mobile}$) can be computed by the mobile device, a server, or another machine that receives needed information as follows:

$$h_{mobile} = h_{sensor} - \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device by a pressure sensor of the mobile device, $P_{sensor}$ is an estimate of pressure at the location of a weather station that is accurate to within a tolerated amount of pressure from true pressure (e.g., less than 5 Pa), $T_{remote}$ is an estimate of temperature (e.g., in Kelvin) at the location of the weather station or a different location of a remote temperature sensor, $h_{sensor}$ is an estimated altitude of the weather station that is estimated to within a desired amount of altitude error (e.g., less than 1.0 meters), g corresponds to the acceleration due to gravity (e.g., −9.8 m/s²), R is a gas constant, and M is molar mass of air (e.g., dry air or other). The minus sign (−) may be substituted with a plus sign (+) in alternative embodiments of Equation 1, as would be understood by one of ordinary skill in the art (e.g., g=9.8 m/s²). The estimate of pressure at the location of the weather station can be converted to an estimated reference-level pressure that corresponds to the weather station in that it specifies an estimate of pressure at the latitude and longitude of the weather station, but at a reference-level altitude that likely differs from the altitude of the weather station. The reference-level pressure can be determined as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the weather station, $P_{ref}$ is the reference-level pressure estimate, and $h_{ref}$ is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

Reference pressures from one or more weather stations can be combined into a reference pressure value that a cellular transmitter transmits (e.g., broadcasts) to mobile devices for use in computing their estimated altitudes or for other uses (e.g., calibrating pressure sensors of the mobile devices). By way of example, FIG. 1 illustrates a cellular network that includes a set of transmitters 110 configured to transmit signals 113 using known transmission technologies. The signals 113 can be transmitted at different times for acquisition by a mobile device 120 as the mobile device 120 moves through the cellular network. The mobile device 120 may take different forms, including a mobile phone or other wireless communication device, a portable computer, a navigation device, a tracking device, a receiver, or another suitable device that can receive the signals 113. A network backend 130 with a control unit—e.g., a positioning server such as eSMLC/LMF (Evolved-Serving Mobile Location Center/Location Management Function)—is connected to the transmitters 110. The backend 130 includes processors (e.g., servers) for performing different types of processing—e.g., collecting reference pressures from weather stations, generating reference pressure values based on collected reference pressures, and other types of processing. Examples of possible components in the transmitters 110, the mobile device 120, and the backend 130 are shown in FIG. 12 and discussed in the 'Other Aspects' section near the end of this disclosure.

The signals 113 transmitted from the transmitters 110 contain different types of information. One type of information is often referred to as "assistance data". Assistance data can be used by the mobile device 120 (or backend 130) to compute an estimated position of the mobile device 120 in terms of latitude, longitude and/or altitude. As previously described, one approach for computing an estimated altitude uses assistance data that includes reference pressures that are based on measurements of pressure from one or more weather stations, and in some cases uses reference temperatures that are based on measurements of temperature from one or more weather stations. As shown in FIG. 1, different weather stations 115 are positioned at different locations throughout the cellular network. Each of the weather stations 115 can determine a reference pressure for a reference altitude (e.g., sea-level altitude), and may measure temperatures. Reference pressure values to be transmitted by the transmitters 110 can be determined based on reference pressures from the weather stations 115. Similarly, a reference temperature can be transmitted by the transmitters 110, where that reference temperature can be determined based on temperatures measured by the weather stations 115. Ideally, each transmitter transmits a reference pressure value that was generated using recently-generated and highly-accurate reference pressures from weather stations that are near that transmitter. In some embodiments, each transmitter transmits a reference temperature value that was generated using recently-measured and highly-accurate temperatures measured by weather stations that are near that transmitter (e.g., using an average of measured temperatures). Ideal circumstances cannot be expected for all cellular networks. Instead, factors that affect the reliability of available reference pressures and/or temperatures must be addressed, including (i) the proximity of a transmitter to weather stations that provide reference pressures and/or temperatures, (ii) the age of reference pressures and/or temperatures—e.g., the time since measurements of pressure used to determine the reference pressures were made or since the temperatures were measured, and (iii) the quality of the reference pressures and/or temperatures—e.g., how recently the weather station was calibrated, the resolution of data from the weather station, exposure of the weather station to over-heating, or some other known conditions that may affect the reliability of the reference pressure and/or temperature. The relative locations of transmitters and weather stations will often vary in a network of transmitters. For example: a transmitter and a weather station can be co-located (e.g., weather station 115a is located within the footprint of transmitter 110a); two or more weather stations can be near a transmitter (e.g., weather stations 115b and 115c are within a threshold distance of transmitter 110b); or no weather station is near a transmitter (e.g., transmitter 110c). The age and quality of reference pressures and/or temperatures can also vary among weather stations. Given the potential differences in relative locations, ages, and/or qualities associated with reference pressures and/or temperatures from weather stations in different cellular networks, different methods for collecting reference pressures and/or temperatures from weather stations are needed to optimize use of available reference pressures for computing a reference pressure value and/or use of available temperature measurements for computing a reference temperature value under different circumstances impacting different transmitters.

Even after reference pressure values and/or reference temperature values are computed, those values must be transmitted to mobile devices (e.g., UEs) using limited and highly valuable bandwidth. In some wireless networks, the reference values are transmitted to mobile devices via point-to-point protocols, such as LPP (LTE Positioning Protocol) [TS 36.355] or SUPL (Secure User Plane Location) Protocol [OMA SUPL] over the wireless network. However, in use cases where there is a high concentration of mobile devices, such as a high-rise building or stadium, it is more efficient to broadcast the reference values via point-to-multi-point. In order to support accurate computations of altitude at any time, transmitter networks must allocate valuable bandwidth for broadcasting updated reference pressure values and/or reference temperatures on a regular basis. However, regular broadcasts of reference pressure values and/or reference temperatures may unnecessarily occupy bandwidth during periods of time when changes in pressure and/or temperature within the cellular network are so limited that older reference pressure values still reflect actual pressure conditions and/or older temperature measurements still reflect actual temperature conditions in the cellular network. On the other hand, regular broadcasts of reference pressure values may not keep up with changes in pressure within the cellular system such that reference pressure values stored on a mobile device become stale before updated reference pressure values are received. Thus, methods for adaptively modifying when to broadcast reference values can decrease consumption of valuable network resources and also improve accuracy of estimated altitudes over time, which is highly desirable. Alternatively, methods for adaptively modifying when mobile devices search the broadcast channel for reference values when previous reference values are stale can increase power savings, which is highly desirable.

Although adjustments to a broadcast schedule offer advantages in some situations, those adjustments may not provide sufficiently-accurate reference pressure values in other situations, such as when weather stations do not produce new reference pressures at a rate that is equal to or greater than the desired adjusted rate of broadcasts, or when a mobile device enters an area in which no broadcasts of reference pressure values are available. Hence, methods for using information about weather changes that are expected within a transmitter network to adjust reference pressure values offers advantages during situations when adjustments to broadcast scheduling would not necessarily provide sufficiently accurate reference pressure values.

BRIEF DESCRIPTION OF THE DRAWINGS

FIG. 1 depicts an operational environment in which systems and methods for determining, broadcasting and using reference pressure data in a network of transmitters may operate.

DETAILED DESCRIPTION

Figure 2A:
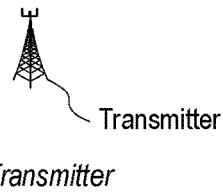
FIG. 2A through FIG. 2F illustrate different cellular elements for use in determining reference pressure data in a network of transmitters.
Figure 2B:
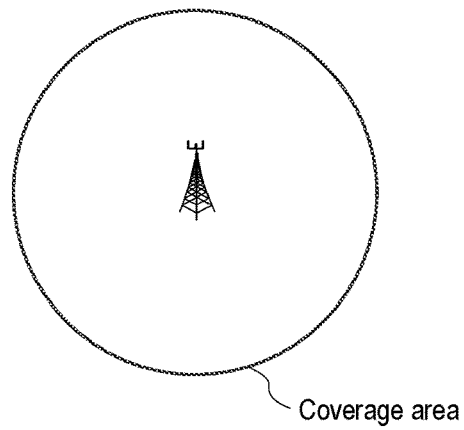
Figure 2C:
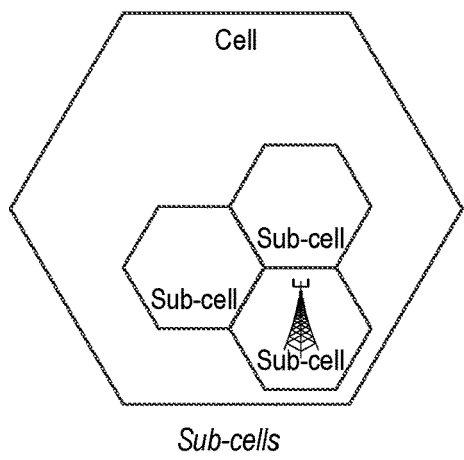
Figure 2D:
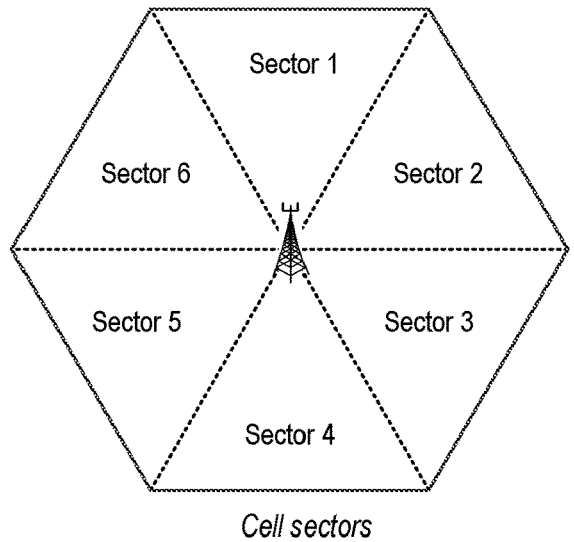
Figure 2E:
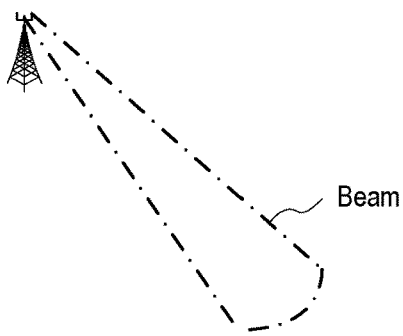
Figure 2F:
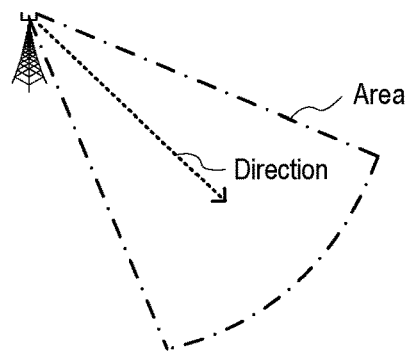

One approach for estimating of an altitude of a mobile device using reference pressures from weather stations is described in the Background section of this disclosure. Typically, weather stations that are dispersed throughout a cellular network provide reference pressures for use in determining a reference pressure value that is transmitted from a cellular transmitter to a receiver that is within range of that transmitter. The reliability of the resultant reference pressure value is impacted by different aspects of a cellular network, including proximity of weather station to transmitter, age of reference pressure, and quality of reference pressure value, as well as changes in weather conditions over time.

Unfortunately, many cellular networks do not include sufficient numbers of weather stations and/or sufficient distribution of weather stations in the vicinity of each transmitter in those networks. Given the varied numbers and distributions of weather stations around different transmitters in a cellular network, different approaches are needed for evaluating candidate reference pressures that can be used to generate a reference pressure value to be transmitted by a transmitter. As discussed further below, different types of cellular elements within a cellular network can be used to select reference pressures from weather stations based on relationships between the weather stations and the cellular element. Examples of cellular elements, which are illustrated in FIG. 2A through FIG. 2F, include a transmitter, a coverage area of the transmitter, a sub-cell occupied by the transmitter (e.g., micro, pico or other sub-cell), a cell sector used by the transmitter, a coverage area of a transmission beam, an area along a direction of a signal transmitted by the transmitter, or sets of the foregoing cellular elements.

(i) For deployments that include multiple weather stations within each cellular element (e.g., large cellular elements like coverage areas of different transmitters), a control unit in the network such as a positioning server (e.g., eSMLC/LMF) can compute a reference pressure value for a transmitter based on a mathematical combination of selected reference pressures from weather stations within a cellular element associated with that transmitter. Different mathematical combinations of selected reference pressures are possible, including weighted averages where weights are based on proximity of weather stations to the cellular element (or a portion of the cellular element), age of the reference pressures, qualities of the reference pressures, and/or other characteristics of the reference pressures or weather stations. In some implementations, a control unit may acquire or construct an isobar plot for an area that includes the cellular element, and use the plot to determine a reference pressure value that is best-suited for the mobile device (e.g., that is located at an estimated position of the mobile device).

(ii) For deployments where there is a many-to-one mapping between cellular elements and weather stations (or where a particular cellular element associated with a transmitter does not include any weather station), a control unit may select reference pressures based on proximity of weather stations to a cellular element even if the weather stations are not in a threshold vicinity of the cellular element, and/or may select reference pressures based on the age of reference pressures, based on quality of the reference pressures, and/or based on some other condition.

(iii) For deployments where there is one-to-one mapping between cellular elements and weather stations, a control unit may use a reference pressure from the weather station within a cellular element as the reference pressure value to be transmitted by the transmitter associated with that cellular element.

(iv) For deployments with a mix of (i), (ii) and (iii) above, a control unit may use different ways of selecting reference pressures depending on the number of weather stations in each cellular element associated with each transmitter, such that different approaches for selecting reference pressures can be used for different transmitters—e.g., using (i) for a first transmitter, using (ii) for a second transmitter, and (iii) for a third transmitter. Alternatively, different types of cellular elements can be used to select a threshold amount of reference pressures for each transmitter—e.g., using a small cellular element (e.g., cell sector) for a first transmitter when that small cellular element includes weather stations that provide at least the threshold amount of reference pressures, and using a large cellular element (e.g., cell) for a second transmitter because a small cellular element for the second transmitter does not include weather stations that provide at least the threshold amount of reference pressures, but the large cellular element includes weather stations that provide at least the threshold amount of reference pressures.

In any deployment, different types of cellular elements can be used to select reference pressures for different transmitters depending on circumstances impacting each transmitter.

Changes in weather conditions over time can also affect the reliability of reference pressure values. Different cellular networks are deployed in different regions that experience different types of pressure changes over time. These changes in pressure affect the validity of reference pressure values. As discussed further below, a control unit of a cellular network can monitor weather within the cellular network—e.g., by accessing weather reports that detail actual and expected changes in pressure over time and distance in different areas of the network—and to determine expected changes in pressure within cellular elements. Expected changes in pressure can be used to determine expiration times for reference pressure values associated with particular cellular elements, which can be used to increase or decrease the rate at which new reference pressure values are determined and transmitted to mobile devices from transmitters associated with those cellular elements. Modifications to the rate at which new reference pressure values are determined and transmitted to mobile devices allow for more-efficient bandwidth usage while ensuring more accurate reference pressure values (and more-accurate altitude estimates) over time compared to systems that do not adjust broadcast schedules in the same way.

Alternatively, changes in pressure over time can be determined and used to adjust previously computed reference pressure values without any need for computing a new reference pressure value using new reference pressures, which reduces the time needed to compute reliable reference pressure values, and provides reliable reference pressure values during times when a new reference pressure value based on new reference pressures cannot be determined or received. Changes in pressure across distances can be monitored and used to limit the validity of reference pressure values to particular areas within the cellular network, such that a moving mobile device can determine if previously received reference pressure values can be used for the mobile device's current location. When a mobile device has moved since last receiving a reference pressure value, changes in pressure across the distance traveled by the mobile device can be determined and used to adjust that reference pressure value without any need for obtaining a new reference pressure value, which reduces bandwidth use, reduces times needed to compute reliable reference pressure values, and provides reliable reference pressure values during times when a new reference pressure value based on new reference pressures cannot be determined or received. Changes across distance may be represented in different ways, including computed gradients.

Different embodiments that incorporate the above aspects are discussed below.

Determining Reference Pressure Data that is Transmitted to Mobile Devices

Figure 3:
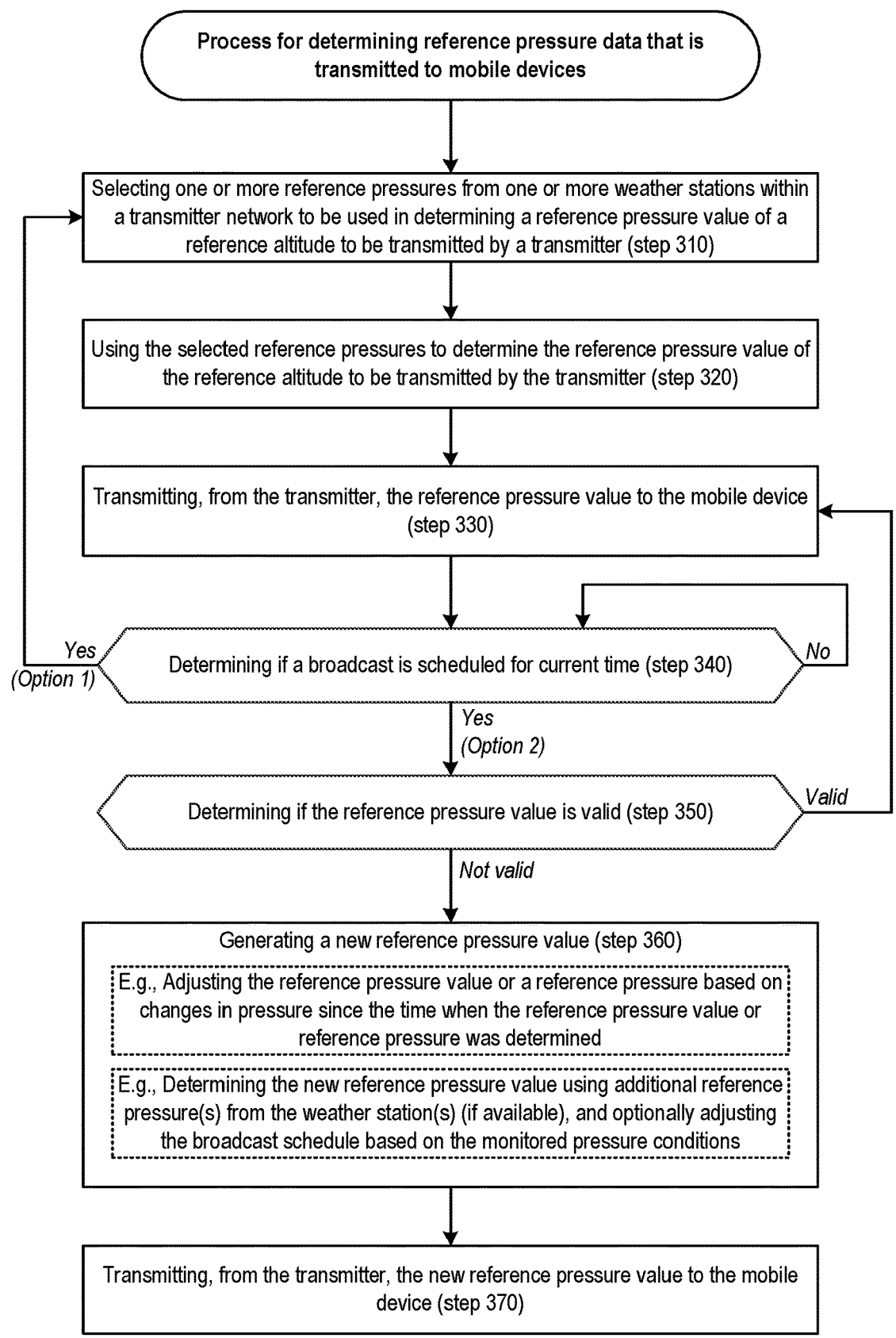
FIG. 3 depicts a process for determining reference pressure data that is transmitted to mobile devices.

FIG. 3 depicts a process for determining reference pressure data that is transmitted to mobile devices.

Figure 4:
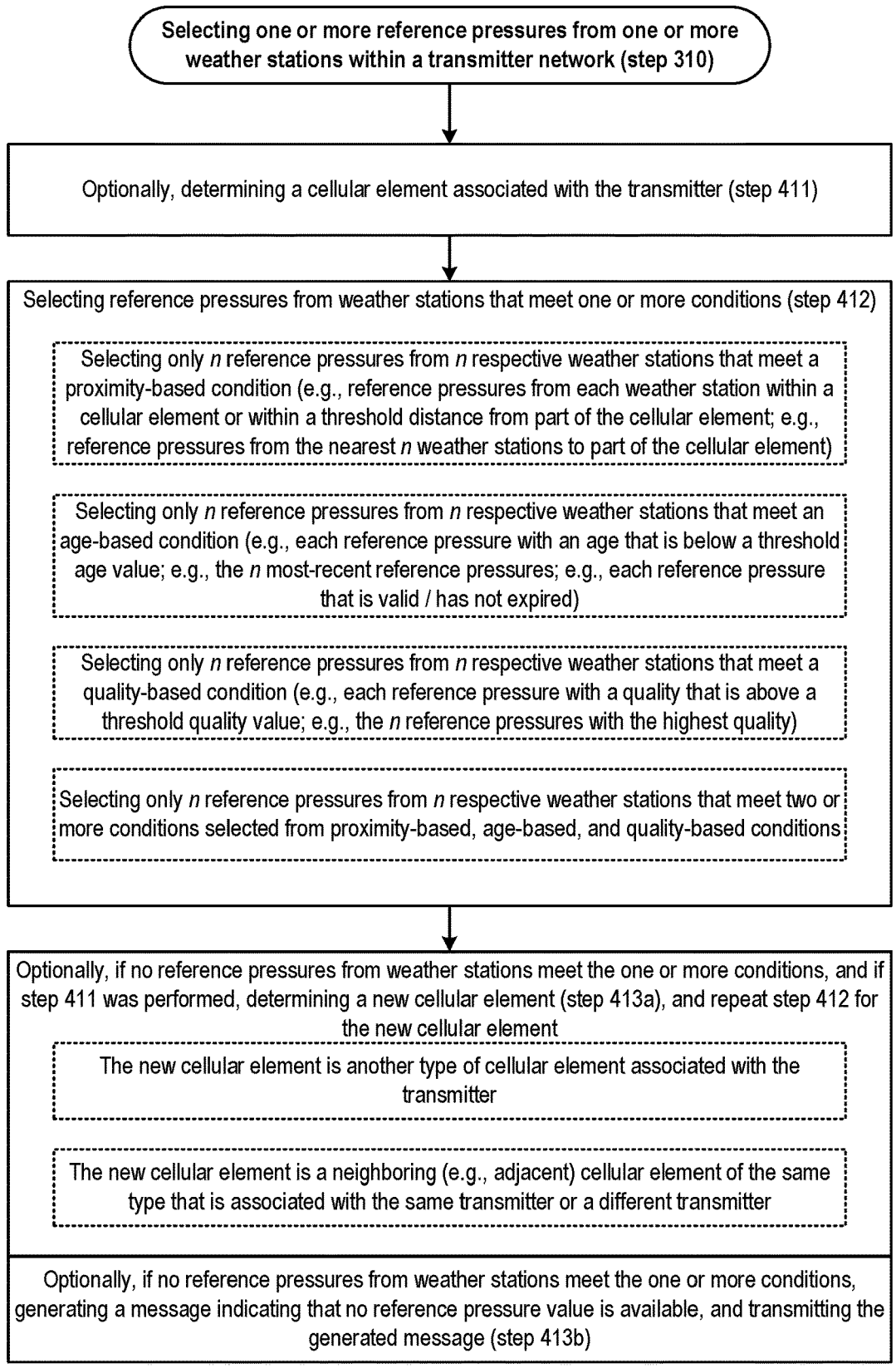
FIG. 4 depicts a process for selecting one or more reference pressures from one or more weather stations within a transmitter network.

Initially, reference pressures from weather stations within a transmitter network are selected for use in determining a reference pressure value of a reference altitude to be transmitted by a transmitter (step 310). One embodiment of step 310 is depicted in FIG. 4, which is described later.

Figure 5:
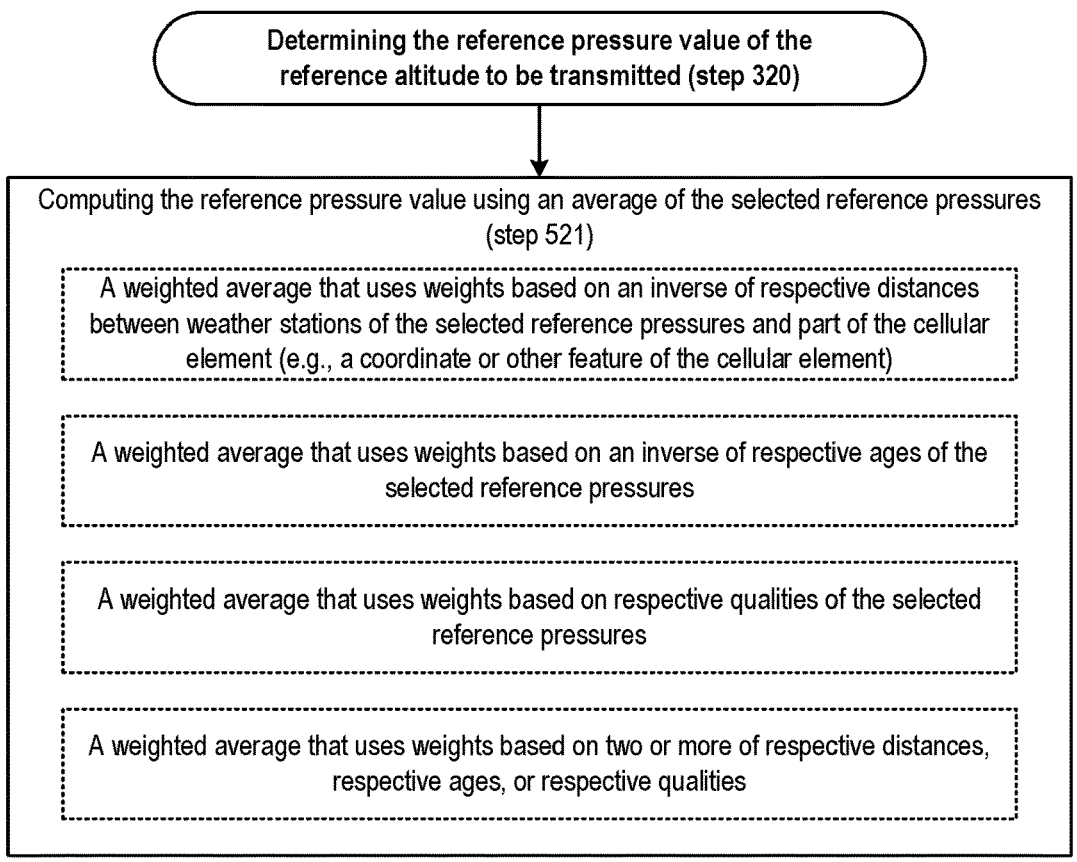
FIG. 5 depicts a process for determining a reference pressure value of a reference altitude to be transmitted.

The selected reference pressures are used to determine a reference pressure value to be transmitted by a transmitter (step 320). One embodiment of step 320 is depicted in FIG. 5, which is described later.

The transmitter transmits the determined reference pressure value (step 330), which is received by any mobile device that is inside a coverage area of the transmitter. By way of example, the transmitter may be a cellular transmitter that transmits scheduled broadcast signals at regular intervals. Alternatively, in other implementations, the transmitter transmits the reference pressure value to a particular mobile device after receiving a request for the reference pressure value from that mobile device.

At a time after initially transmitting the previous reference pressure value, a determination is made if transmission of a new reference pressure value is scheduled for that time (step 340). If transmission of a new reference pressure value is not scheduled for that time, step 340 is repeated.

Figure 6:
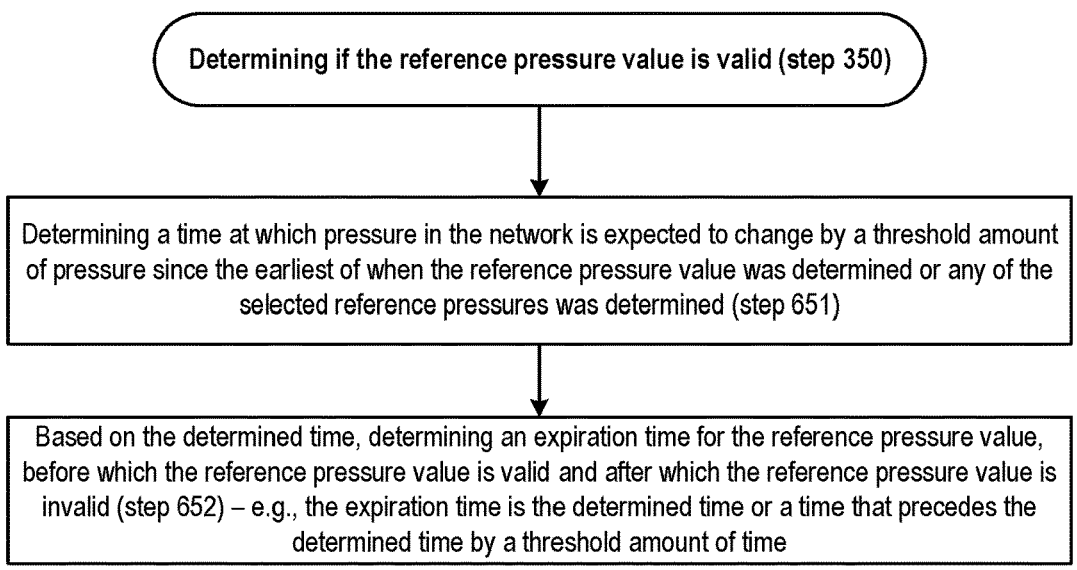
FIG. 6 depicts a process for determining if a reference pressure value is valid.

In one embodiment (option 1), if transmission of a new reference pressure value is scheduled for that time, the process returns to step 310. In another embodiment (option 2), if transmission of a new reference pressure value is scheduled for that time, a determination is made as to whether a previously-determined (e.g., most-recently determined) reference pressure value is valid (step 350). One embodiment of step 350 is depicted in FIG. 6, which is described later.

If the reference pressure value is still valid, the process returns to step 330, and the reference pressure value is transmitted to the mobile device.

If the reference pressure value is not valid, a new reference pressure value is generated (step 360).

In a first embodiment of step 360, the new reference pressure value is generated by selecting newer reference pressures from weather stations and determining the new reference pressure value using the same process as used for step 320, but with the newer reference pressures instead of the older reference pressures from step 310. Optionally, any schedule for determining and transmitting reference pressure values over time can be adjusted based on monitored pressure conditions. For example, (i) a rate of pressure change in the network or in an area that includes the transmitter and/or weather stations that provided selected reference pressures can be determined (e.g., from regional or more defined weather reports), and (ii) the rate of pressure change can be used to determine a maximum time between reference pressure value determinations and transmissions by dividing a maximum amount of tolerated change in pressure (e.g., 10 Pa) by the rate of pressure change, and using the resulting time as the maximum time between reference pressure value determinations and transmissions.

Figure 7A:
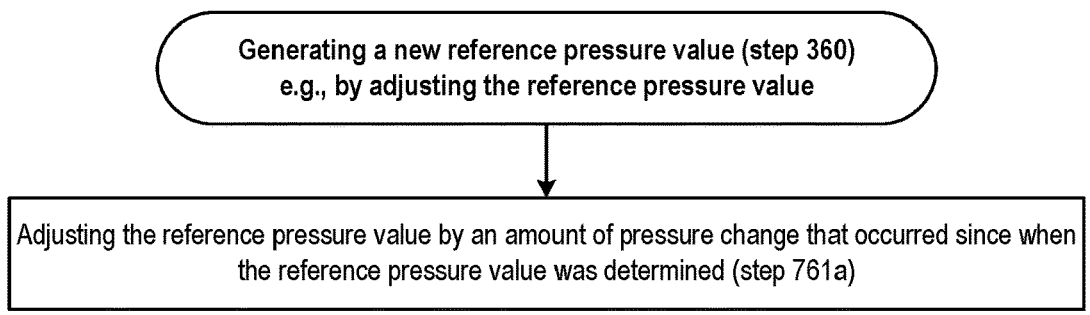
FIG. 7A depicts a process for generating a new reference pressure value by adjusting a reference pressure value.
Figure 7B:
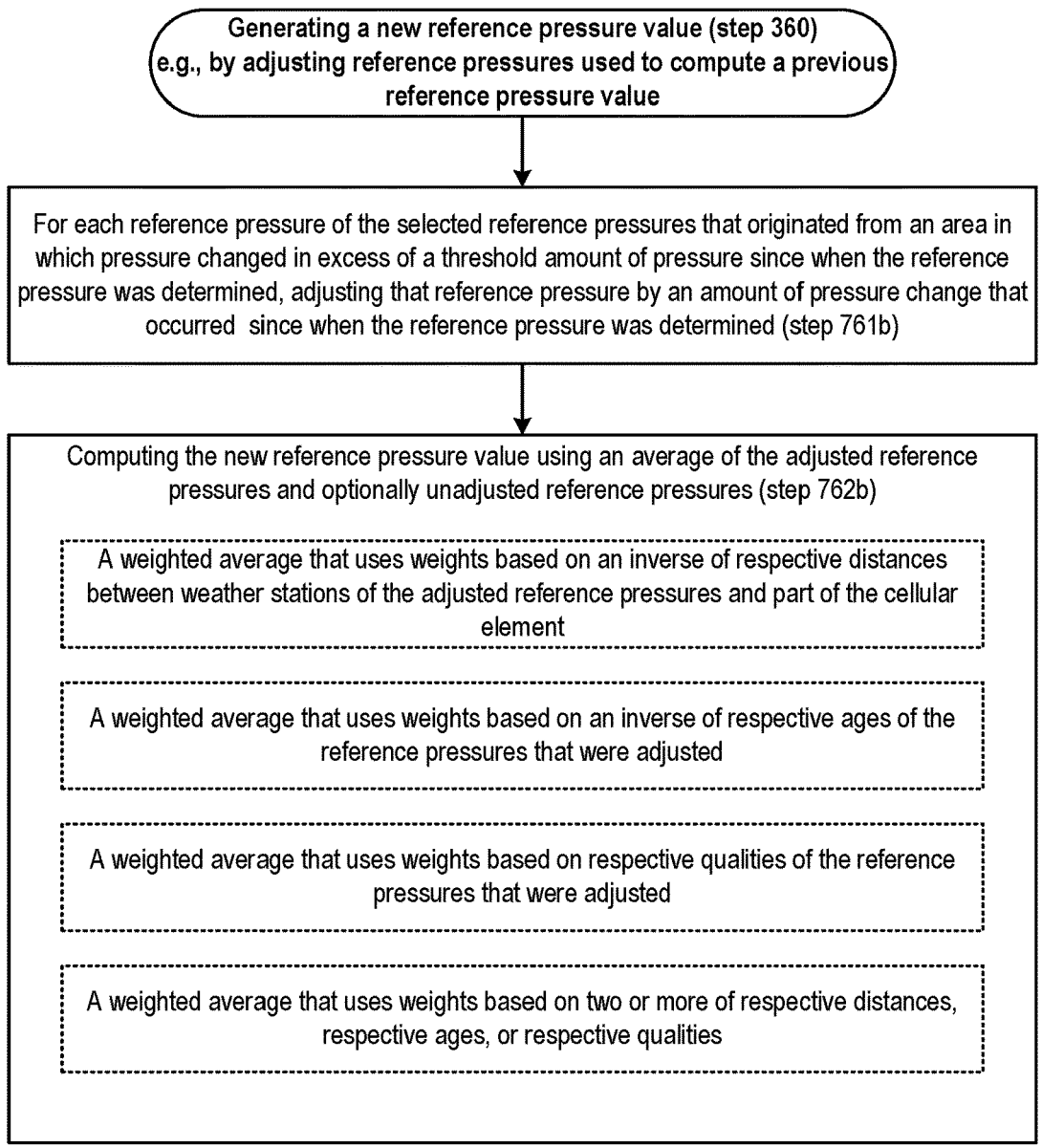
FIG. 7B depicts a process for generating a new reference pressure value by adjusting reference pressures used to compute a previous reference pressure value.

In a second embodiment of step 360, the new reference pressure value is generated by adjusting the older reference pressure value from step 320 based on measured or expected changes in pressure since the time when the reference pressure value was determined during step 320. Example implementations of the second embodiment of step 360 are depicted in FIG. 7A and FIG. 7B, which are described later.

Lastly, the transmitter transmits the new reference pressure value (step 370)—e.g., to any mobile device that resides within a coverage area of the transmitters, or to a particular mobile device for embodiments that permit requests for new reference pressure values from such a mobile device.

In an alternative embodiment (not shown), steps 310 through 340 are performed, except that a determination during step 340 that transmission of a new reference pressure value is not scheduled for that time results in determining if the reference pressure value is valid (step 350), after which the process (i) returns to step 340 if the reference pressure value is valid, and (ii) advances to 360 if the reference pressure value is not valid. After step 360, the process returns to step 340.

In an alternative embodiment (not shown), step 340 is omitted, and step 350 is performed after step 330.

By way of example, the network backend 130 and/or a processor of the transmitter can be used to perform steps 310, 320, 340, 350 and 360.

Selecting One or More Reference Pressures from One or More Weather Stations within a Transmitter Network (Step 310)

FIG. 4 depicts a process for selecting one or more reference pressures from one or more weather stations within a transmitter network for use in determining a reference pressure value during an embodiment of step 310.

A cellular element associated with the transmitter is optionally determined (step 411). By way of example, different cellular elements are illustrated in FIG. 2A through FIG. 2F, including the transmitter itself, a coverage area of the transmitter, a sub-cell occupied by the transmitter, a cell sector used by the transmitter, a coverage area of a transmission beam, an area along a direction of a signal transmitted by the transmitter, or other cellular elements. Sets of these cellular elements could also be used as a "cellular element" that is determined in some embodiments. Any process known in the art for defining the boundaries and characteristics of each cellular element can be used.

Reference pressures from weather stations that meet one or more conditions are selected (step 412).

In a first embodiment of step 412, n reference pressures from n respective weather stations that meet a proximity-based condition are selected. In one implementation, reference pressures from each weather station within the cellular element, within a threshold distance (for example: 100 yards; 1 mile; or 10 miles) from part of the cellular element (e.g., a coordinate of the cellular element), or within an area that includes the cellular element can be selected. In another implementation, reference pressures from the nearest n weather stations to part of the cellular element are selected.

In a second embodiment of step 412, n reference pressures from n respective weather stations that meet an age-based condition are selected (for example: reference pressure measure is less than 10 minutes old, or less than 1 hour old). In one implementation, each reference pressure with an age that is below a threshold age value is selected. In another implementation, the n most-recent reference pressures are selected. In yet another implementation, each reference pressure that is valid—e.g., has not expired—is selected.

In a third embodiment of step 412, n reference pressures from n respective weather stations that meet a quality-based condition are selected. In one implementation, each reference pressure with a quality that is above a threshold quality value is selected. In another implementation, the n reference pressures with the highest quality are selected. A quality metric can be determined for each reference pressure, where higher values of the metric represent higher quality. By way of example, if the metric is based on time since a weather station was calibrated, a higher metric value would be given for more recent calibration. By way of another example, if the metric represents if a weather station experiences overheating (e.g., from sun exposure or HVAC exhaust), a high metric value is given to reference pressures that originate from weather stations that do not experience over-heating while a low metric value is given to reference pressures that originate from weather stations that experience over-heating. By way of example, a quality metric may be a tolerance in the pressure measurement where a lower tolerance indicates a higher quality.

In a fourth embodiment of step 412, n reference pressures from n respective weather stations that meet two or more conditions selected from proximity-based, age-based, or quality-based conditions are selected. Different orders of conditions are possible—e.g., apply a proximity-based condition to identify a set of candidate reference pressures, and then apply an age-based or quality-based condition to identify the selected reference pressures, or vice versa.

In a fifth embodiment, a series of conditions are tested until reference pressures are selected or until there are no more conditions to test. In one implementation, a first condition is tested (e.g., proximity), and if no reference pressures are selected based on the first condition then a second condition is tested (e.g., age), and so on for other conditions. In another implementation, a set of conditions are tested (e.g., proximity and age), and if no reference pressures are selected based on the set of conditions then a portion of the set of the conditions is tested (e.g., proximity only), and if no reference pressures are selected based on that portion of the set of conditions then another portion of the set of the conditions is tested (e.g., age only), and so on for other portions of the set of conditions.

Optionally, if no reference pressures from weather stations meet the one or more conditions, a new cellular element may be determined (step 413a), and the process returns to step 412 for the new cellular element.

In one embodiment of the process depicted in FIG. 4, the new cellular element is another type of cellular element associated with the transmitter—e.g., the first type of cellular element is a cellular element associated with a smaller area such as a transmission beam directed from a transmitter towards the mobile device or a cell sector, and the second type of cellular element is a type of cellular element associated with a larger area such as a coverage area of the transmitter. Initially using a cellular element associated with a smaller area to select reference pressures increases the accuracy of a reference pressure value relative to a mobile device since the smaller cellular element is more likely to select reference pressures that are experiencing similar pressure conditions as the mobile device.

In another embodiment of the process depicted in FIG. 4, the new cellular element is the same type of cellular element, but is associated with a different transmitter (e.g., a different transmitter adjacent to the transmitter). The new cellular element is a neighboring (e.g., adjacent) cellular element of the same type that is associated with the same transmitter or a different transmitter—e.g., if the first cellular element is a cell sector of a cell in which a transmitter resides, then the new cellular element may be an adjacent cell sector in that same cell; e.g., if the first cellular element is a cell in which a transmitter resides, then the new cellular element may be an adjacent cell in which a neighboring transmitter resides.

Optionally, if no reference pressures from weather stations meet the one or more conditions, a message indicating that no reference pressure value is available can be generated and transmitted (step 413b).

Different embodiments of FIG. 4 include different sets of the steps. A first embodiment includes steps 411, 412 and 413. A second embodiment only includes step 412 (i.e., there is consideration of conditions, but there is no consideration of cellular elements).

The processes of FIG. 3 and FIG. 4 can be performed for different transmitters, and the results may be different for different transmitters depending on the distribution of weather stations relative to the different transmitters—e.g., no performance of step 413a may be required to produce selected reference pressures for a first transmitter, but performance of step 413a may be required to produce selected reference pressures for a second transmitter.

Determining a Reference Pressure Value at a Reference Altitude to be Transmitted (Step 320)

FIG. 5 depicts a process for determining a reference pressure value at a reference altitude to be transmitted during an embodiment of step 320, which comprises computing the reference pressure value using an average of the selected reference pressures (step 521).

In one implementation of step 521, the average is a weighted average that uses weights based on an inverse of respective distances between weather stations of the selected reference pressures and part of the cellular element (e.g., a coordinate or other feature of the cellular element), such that a reference pressure from a weather station that is closer to the cellular element is given greater weight than a reference pressure from another weather station that is further away from the cellular element. Since reference pressure can change over distance, closer reference pressures more-accurately reflect reference pressure at the two-dimensional location of the transmitter than reference pressures that are further away.

In another implementation of step 521, the average is a weighted average that uses weights based on an inverse of respective ages of the selected reference pressures, such that a reference pressure that is more-recently determined is given greater weight than a reference pressure that was determined further in the past. Since pressure can change over time, recently-determined reference pressures more-accurately reflect reference pressure at the current time than older reference pressures.

In yet another implementation of step 521, the average is a weighted average that uses weights based on respective qualities of the selected reference pressures, such that a reference pressure that originates from a more-reliable source is given greater weight than a reference pressure that originates from a less-reliable source. Since weather stations can experience different issues (e.g., rate of drift, overheating, etc.), reference pressures from more-reliable weather stations (e.g., weather stations that have been recently calibrated, that have less or no overheating, etc.) to more-accurately reflect actual reference pressure than reference pressures from less-reliable weather stations (e.g., weather stations that have not been recently calibrated, that are affected by overheating, etc.).

In yet another implementation of step 521, the average is a weighted average that uses weights based on two or more of respective distances, respective ages, or respective qualities.

Determining if a Reference Pressure Value is Valid (Step 350)

FIG. 6 depicts a process for determining if a reference pressure value is valid during an embodiment of step 350.

Initially, a time at which pressure in the network is expected to change by a threshold amount of pressure since a past instance of time is determined (step 651). In different embodiments, the past instance of time can be when the reference pressure value was determined, when a selected reference pressure was determined, or another time. In one embodiment, the time is determined by dividing the threshold amount of pressure by an expected rate of pressure change to yield an amount of time, and then adding the amount of time to the past instance of time to determine the time at which pressure in the network is expected to change by the threshold amount of pressure. The threshold amount of pressure can vary in different embodiments. In one embodiment, the threshold amount of pressure is set to an amount of pressure corresponding to a maximum amount of tolerated error for estimated altitudes (e.g., 10 Pa). In some embodiments, the determination during step 651 is of a time at which pressure is expected to change by the threshold amount of pressure within a particular area of the network that includes the transmitter and/or a weather station that provided a reference pressure used to compute the reference pressure value. Restricting step 651 to pressure changes within particular areas makes the determination more relevant to pressure conditions that are actually expected to affect the transmitter and/or weather stations. In some embodiments, the area may be determined by cellular element as discussed above.

An expiration time for the reference pressure value, before which the reference pressure value is valid and after which the reference pressure value is invalid, is determined based on the determined time (step 652). In one embodiment of step 652, the expiration time is the determined time. In another embodiment of step 652, the expiration time is a time that precedes the determined time by a threshold amount of time (e.g., t units of time).

An area in which the reference pressure value is valid can be determined with or without an expiration time. The area may be a particular localized pressure zone among other localized pressure zones, such that the reference pressure value is only valid in the particular localized pressure zone. Alternatively, the area may be an area in the network that is not expecting changes in pressure that are expected for other areas in the network, such that the reference pressure value is not valid in those other areas.

Generating a New Reference Pressure Value (step 360)

FIG. 7A and FIG. 7B depict processes for generating a new reference pressure value during different embodiments of step 360.

FIG. 7A depicts a process for generating a new reference pressure value by adjusting a reference pressure value, which comprises adjusting the reference pressure value by an amount of pressure change that occurred since the reference pressure value was determined (step 761a). The amount of pressure change that occurred can be determined in different ways, for example, including measurements of the pressure change from weather stations in the network or from a weather report.

FIG. 7B depicts a process for generating a new reference pressure value by adjusting reference pressures that were used to compute the previous reference pressure value. For each reference pressure of the selected reference pressures that originated from an area in which pressure changed in excess of a threshold amount of pressure since the reference pressure was determined, that reference pressure is adjusted by an amount of pressure change that occurred since that reference pressure was determined (step 761b), and the new reference pressure value is computed using an average of the adjusted reference pressures (step 762b). In one implementation of step 762b, the average is a weighted average that uses weights based on an inverse of respective distances between weather stations of the adjusted reference pressures and part of the cellular element. In another implementation of step 762b, the average is a weighted average that uses weights based on an inverse of respective ages of the reference pressures that were adjusted. In yet another implementation of step 762b, the average is a weighted average that uses weights based on respective qualities of the reference pressures that were adjusted. Alternatively, the average may be a weighted average that uses weights based on two or more of respective distances, respective ages, or respective qualities As indicated above with respect to step 330 of FIG. 3, a mobile device that is within a coverage area of the transmitter can receive a reference pressure value transmitted by the transmitter. That mobile device can use the received reference pressure value to determine reference pressure data for use in estimating an altitude of the mobile device or for other uses (e.g., calibrating a pressure sensor of the mobile device). As discussed below with respect to FIG. 8, different approaches can be used to determine such reference pressure data.

Figure 8:
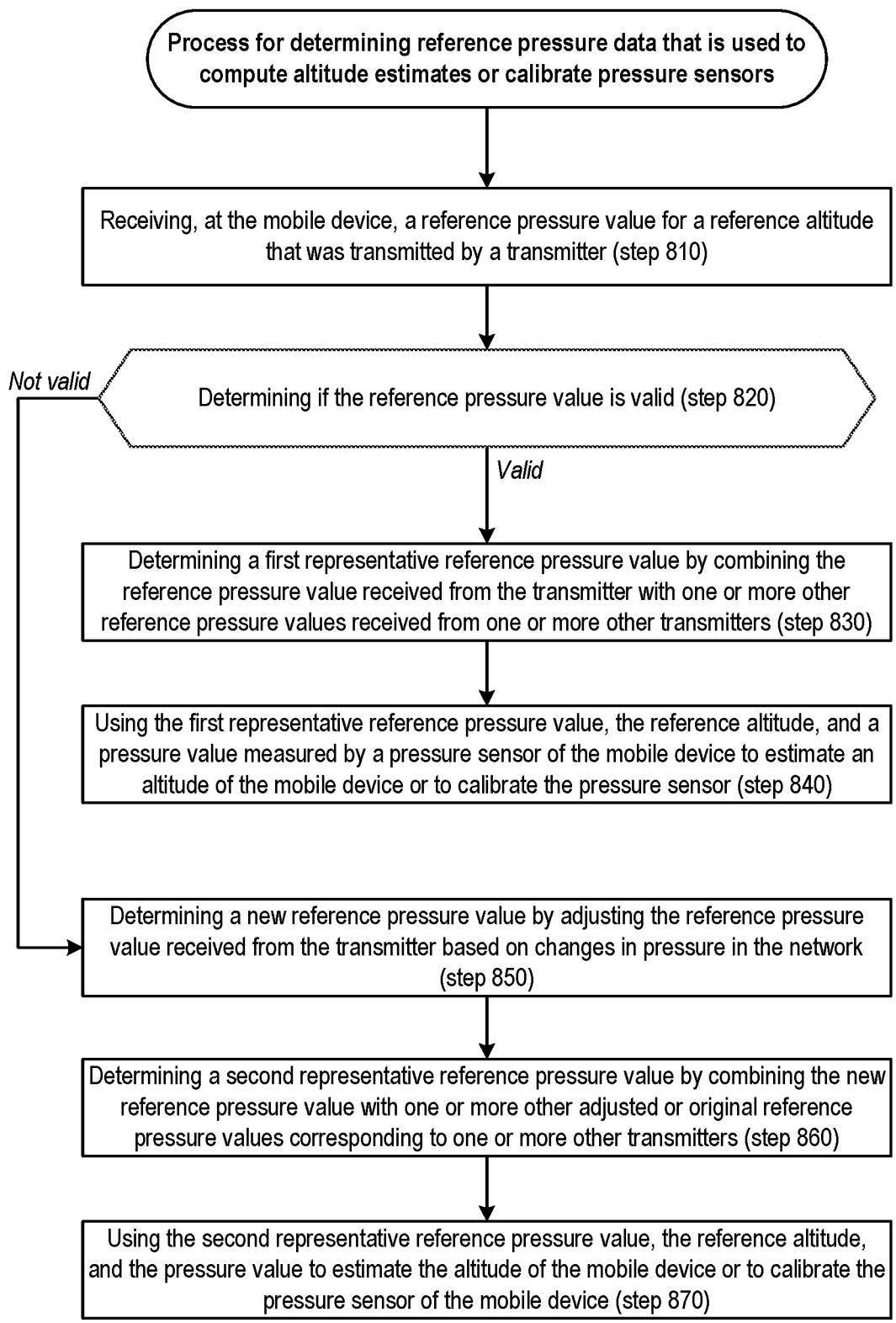
FIG. 8 depicts a process for determining reference pressure data that is used to compute altitude estimates of mobile devices or calibrate pressure sensors of mobile devices.

Determining Reference Pressure Data that is used to Compute Altitude Estimates of Mobile Devices or Calibrate Pressure Sensors of Mobile Devices FIG. 8 depicts a process for determining reference pressure data that can be used to compute altitude estimates of mobile devices. Alternatively, the reference pressure data can be used to calibrate pressure sensors of mobile devices, or other uses that are known in the art.

Initially, a mobile device receives a reference pressure value for a reference altitude that was transmitted by a transmitter (step 810).

Figure 9A:
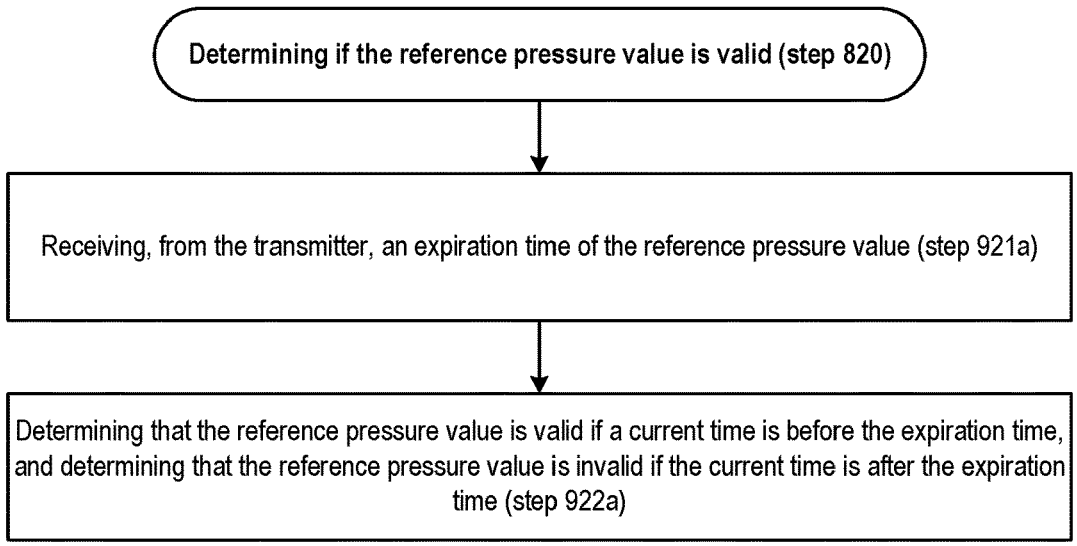
FIG. 9A and FIG. 9B depict processes for determining if a received reference pressure value is valid.
Figure 9B:
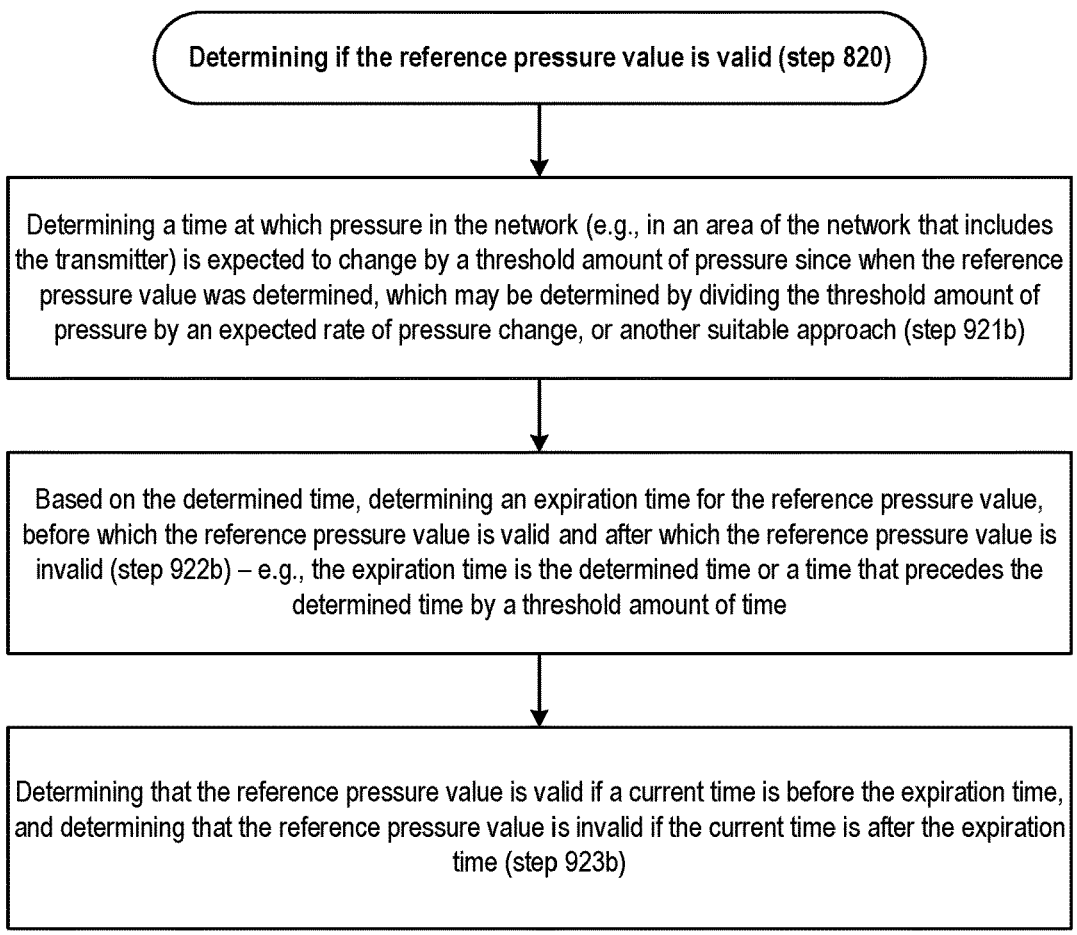

At any time after receiving the reference pressure value, and before receiving any new reference pressure value from the transmitter, a determination is made as to whether the reference pressure value is valid (step 820). Embodiments of step 820 are depicted in FIG. 9A and FIG. 9B, which are described later.

If the reference pressure value is determined to be valid during step 820, a first representative reference pressure value is determined by combining the reference pressure value received from the transmitter with any other valid reference pressure values received from other transmitters (step 830). Embodiments of step 830 are depicted in FIG. 10A, FIG. 10B, FIG. 10C, and FIG. 10D, which are described later.

After the first representative reference pressure value is determined, it can be used with the reference altitude and a pressure value measured by a pressure sensor of the mobile device to estimate an altitude of the mobile device (step 840).

Figure 11A:
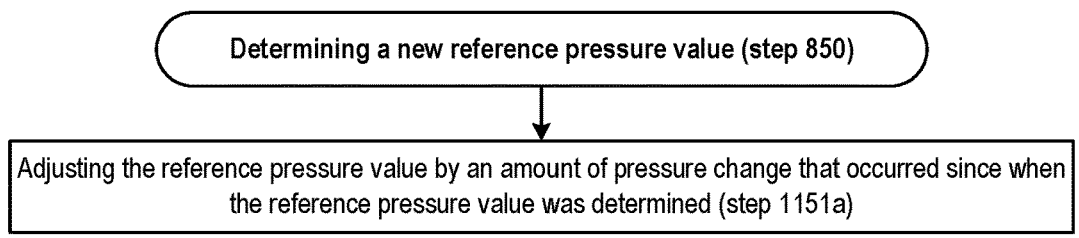
FIG. 11A through FIG. 11C depict processes for determining a new reference pressure value.
Figure 11B:
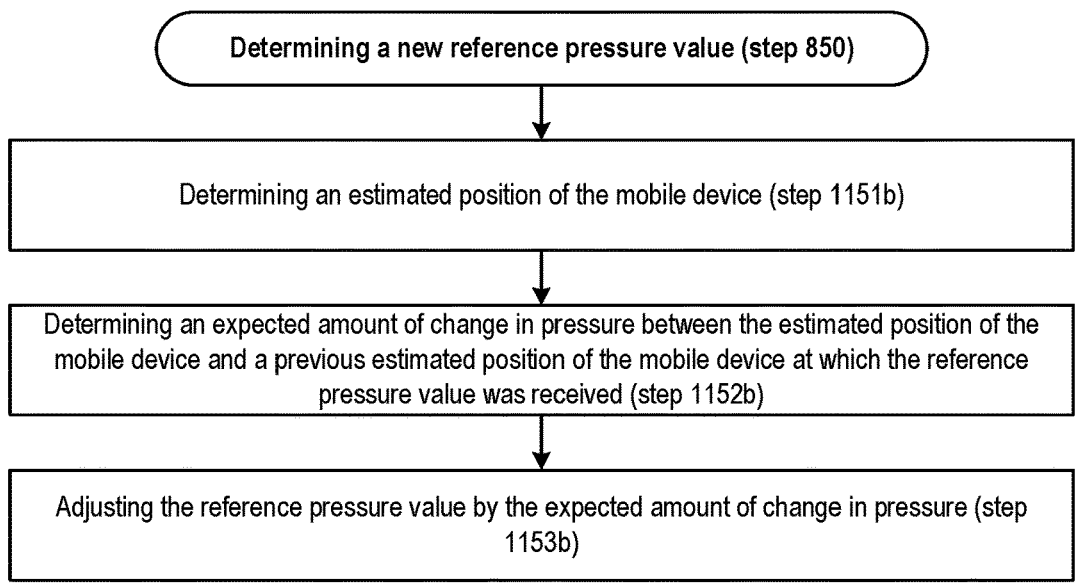
Figure 11C:
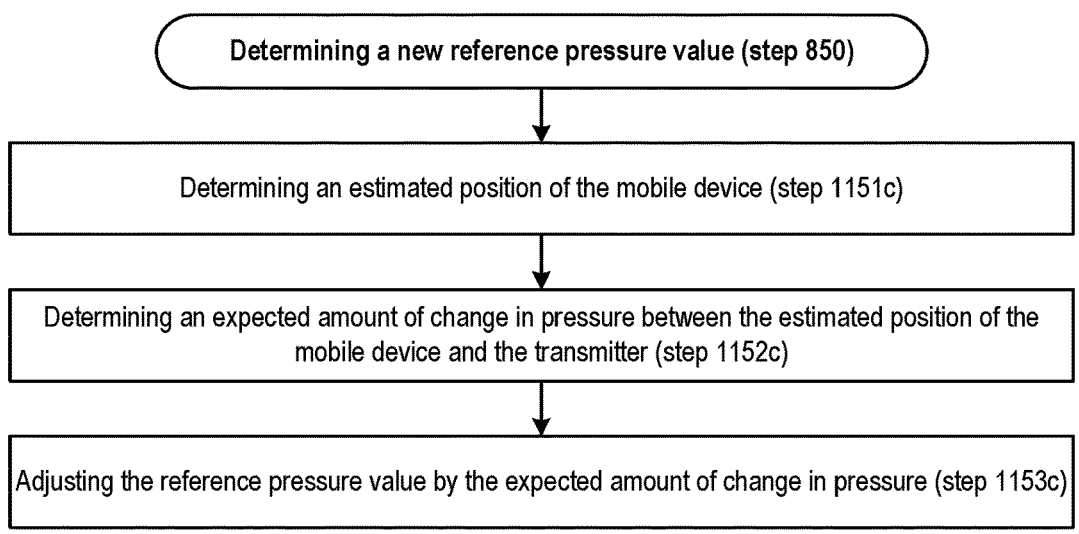

If the reference pressure value is determined to be not valid during step 820, a new reference pressure value is determined by adjusting the reference pressure value received from the transmitter based on changes in pressure in the network that have occurred since the reference pressure value was originally determined or since the reference pressure value was received (step 850). Embodiments of step 850 are depicted in FIG. 11A, FIG. 11B, and FIG. 11C, which are described later.

After the new reference pressure value is determined, a second representative reference pressure value is determined by combining the new reference pressure value with one or more other new reference pressure values and or valid older reference pressure values corresponding to other transmitters (step 860)—e.g., using the same process as used for step 830.

After the second representative reference pressure value is determined, it can be used with the reference altitude and the pressure value measured by the pressure sensor of the mobile device to estimate the altitude of the mobile device (step 870—e.g., using the same process as used for step 840.

By way of example, a processor of the mobile device can be used to perform steps 820, 830, 840, 850, 860 and 870. Alternatively, information needed to perform some or all of these steps can be provided from the mobile device to the network backend 130 of FIG. 1 using known communication pathways, and the backend 130 performs those steps.

Determining if a Received Reference Pressure Value is Valid (step 820)

FIG. 9A and FIG. 9B depict processes for determining if a received reference pressure value is valid during embodiments of step 820.

During FIG. 9A, an expiration time of the reference pressure value is received by the mobile device from a transmitter (step 921*a*), and a determination is made if the reference pressure value is valid (step 922*a*). In one implementation, the reference pressure is valid when the time at which step 922*a* is performed is before the expiration time, and the reference pressure value is not valid if the time at which step 922*a* is performed is after the expiration time.

During FIG. 9B, a time at which pressure in the network is expected to change by a threshold amount of pressure since a past instance of time is determined (step 921*b*). In different embodiments, the past instance of time can be when the reference pressure value was determined, when a selected reference pressure was determined, or another time. In one embodiment, the time is determined by dividing the threshold amount of pressure by an expected rate of pressure change to yield an amount of time, and then adding the amount of time to the past instance of time to determine the time at which pressure in the network is expected to change by the threshold amount of pressure. The threshold amount of pressure can vary in different embodiments. In one embodiment, threshold amount of pressure is set to an amount of pressure corresponding to a maximum amount of tolerated error for estimated altitudes (e.g., 10 Pa). In some embodiments, the determination during step 921*b* is of a time at which pressure is expected to change by the threshold amount of pressure within a particular area of the network that includes the transmitter and/or a weather station that provided a reference pressure used to compute the reference pressure value. Restricting step 921*b* to pressure changes within particular areas makes the determination more relevant to pressure conditions that are actually expected to affect the transmitter and/or weather stations.

An expiration time for the reference pressure value, before which the reference pressure value is valid and after which the reference pressure value is invalid, is determined based on the determined time (step 922*b*). In one embodiment of step 922*b*, the expiration time is the determined time. In another embodiment of step 652, the expiration time is a time that precedes the determined time by a threshold amount of time.

A determination is made if the reference pressure value is valid (step 923*b*). In one implementation, the reference pressure is valid when the time at which step 923*b* is performed is before the expiration time, and the reference pressure value is not valid if the time at which step 923*b* is performed is after the expiration time.

In some embodiments, an area of validity for a reference pressure value can also or alternatively be determined and then provided to a mobile device. In these embodiments, an estimated position of the mobile device can be computed (e.g., latitude and longitude). A determination is made if the estimated position is within the area of validity, or within a threshold distance of the area of validity. If so, the reference pressure value is treated as valid. If not, the reference pressure value is treated as not valid.

Using Validity of Reference Pressure Value to Control Whether a Mobile Device Searches a Broadcast Channel In some embodiments, step 820 of FIG. 8, including the sub-steps of FIG. 9A or FIG. 9B can be performed to determine the validity of a reference pressure value that was previously received from a transmitter. If the value is valid, a decision is made at the mobile device to not have the mobile device search for a broadcast of a new reference pressure value. Not searching can continue until the previously received reference pressure value is no longer valid, after which the mobile device searches for a new reference pressure value. Alternatively, the search for a new reference pressure value may start at a predetermined amount of time prior to the end of validity under circumstances when the end of validity is known. Advantages of using the validity of a reference pressure value to control whether a mobile device searches a broadcast channel for a new reference pressure value include power savings and increases in processing capacity while searching is not being performed.

Determining a Representative Reference Pressure Value by Combining Reference Pressure Values (step 830)

FIG. 10A through FIG. 10D depict processes for determining a representative reference pressure value by combining reference pressure values during embodiments of step 830.

Figure 10A:
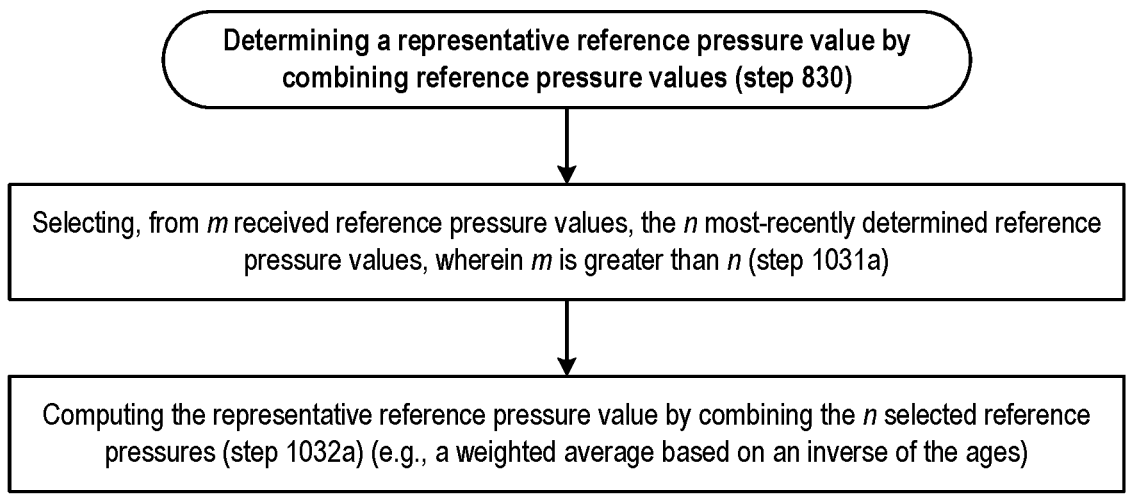
FIG. 10A through FIG. 10D depict processes for determining a representative reference pressure value by combining reference pressure values.

During FIG. 10A, the n most-recently determined reference pressure values are selected from m received reference pressure values, wherein m is greater than n (step 1031*a*), and the representative reference pressure value is computed by combining the n selected reference pressures (step 1032*a*). In one implementation, the combination is a weighted average based on an inverse of the ages.

Figure 10B:
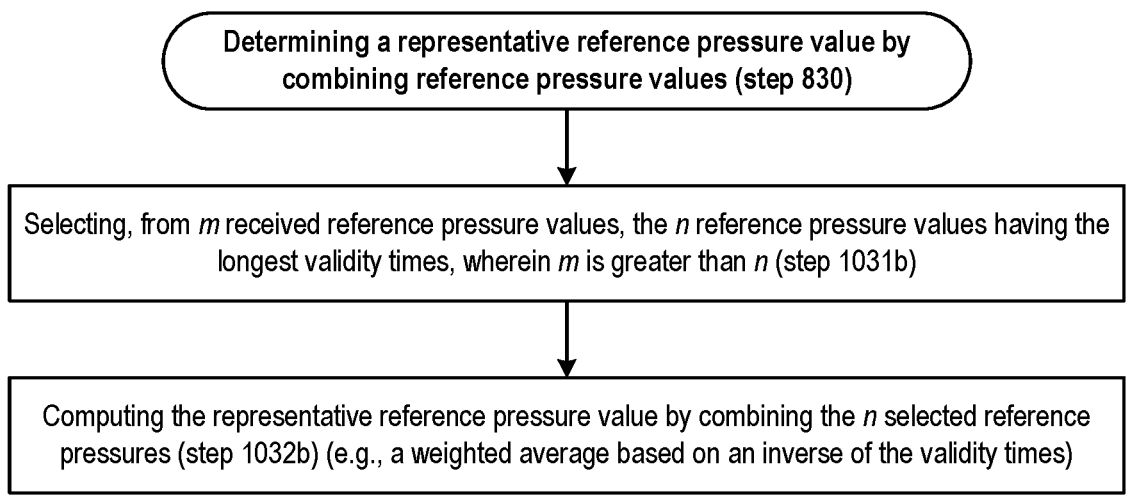

During FIG. 10B, the n reference pressure values having the longest validity times are selected from m received reference pressure values, wherein m is greater than n (step 1031*b*), and the representative reference pressure value is computed by combining the n selected reference pressures (step 1032*b*). In one implementation, the combination is a weighted average based on an inverse of the validity times.

Figure 10C:
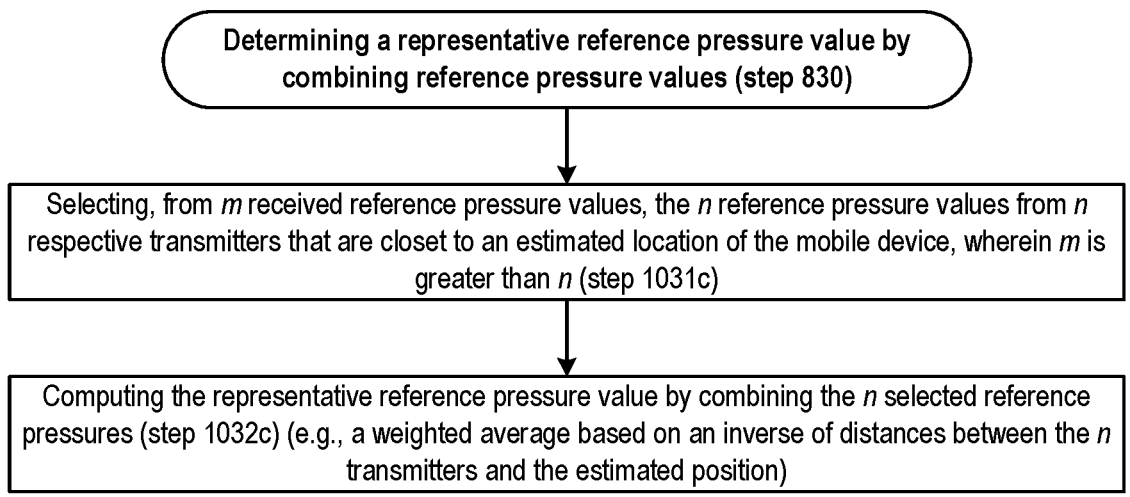

During FIG. 10C, the n reference pressure values from n respective transmitters that are closest to an estimated location of the mobile device are selected from m received reference pressure values, wherein m is greater than n (step 1031*c*), and the representative reference pressure value is computed by combining the n selected reference pressures (step 1032*c*). In one implementation, the combination is a weighted average based on an inverse of distances between the n transmitters and the estimated position of the mobile device.

Figure 10D:
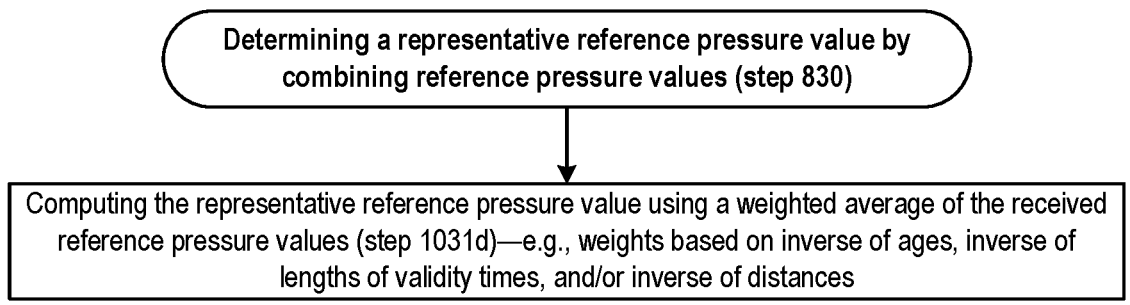

During FIG. 10D, the representative reference pressure value is computed using a weighted average of the received reference pressure values (step 1031*d*). In different implementations, the weights can be based on any of inverses of ages, inverses of lengths of validity times, and/or inverses of distances (e.g., between the n transmitters and the estimated position of the mobile device).

Determining a New Reference Pressure Value (step 850)

FIG. 11A through FIG. 11C depict processes for determining a new reference pressure value during embodiments of step 850.

During FIG. 11A, the reference pressure value is adjusted by an amount of pressure change that occurred since the reference pressure value was determined (step 1151a).

During FIG. 11B, an estimated position of the mobile device is determined (step 1151b), an expected amount of change in pressure between the estimated position of the mobile device and a previous estimated position at which the reference pressure value was received is determined (step 1152b), and the reference pressure value is adjusted by the expected amount of change in pressure (step 1153b).

During FIG. 11C, an estimated position of the mobile device is determined (step 1151c), an expected amount of change in pressure between the estimated position of the mobile device and the transmitter is determined (step 1152c), and the reference pressure value is adjusted by the expected amount of change in pressure (step 1153c).

Additional Operations for Networks that use Requests for Assistance Information from Mobile Devices Different systems can benefit from the approaches described above, including (i) systems that broadcast assistance information (e.g., reference pressure values) on a schedule, and (ii) systems that transmit reference pressure values in response to receiving requests from mobile devices for a reference pressure value. In the latter systems, additional functionality may be used. For example, mobile devices can monitor times when particular reference pressure values expire. If areas of validity are used, the mobile devices can also monitor areas in which particular reference pressure values are not valid. If a reference pressure value from a transmitter has expired, or is not valid in an area in which the mobile device is believed to reside (e.g., based on comparison of an estimated position of the mobile device and an area of validity for the reference pressure value), the mobile device can ignore that reference pressure value, adjust it, request an adjustment to the reference pressure value (or an adjusted reference pressure value) from the transmitter or the network backend, or request a new reference pressure value from the transmitter if still in range of the transmitter.

Application of Methods to Other Data Provided by Weather Stations

Discussion above has been generally focused on reference pressures and reference pressure values. However, the approaches can be modified as would be understood by one of ordinary skill in the art to select temperature measurements of weather stations before using the selected temperature measurements to determine a reference temperature value for use in the altitude computation that is based on selected temperature measurement(s) from weather station(s). For example, each of the methods could be modified to replace "pressure" with "temperature". For embodiments where reference temperatures are not used, then measured temperatures that were measured at different altitudes can replace reference pressures of the reference altitude. Selection of temperature or reference temperatures could be based on proximity, age, quality, or another condition. Similarly, the approaches can be modified as would be understood by one of ordinary skill in the art to select humidity (or reference humidity), other atmospheric parameters, or any data that is available from weather stations. Use of measured temperatures to determine a reference temperature value can involve averaging the measured temperatures (e.g., based on weights) to determine the reference temperature value, or adjusting the measured temperatures to reference temperatures at a reference altitude (e.g., using techniques that are known in the art) before averaging the resultant reference temperatures to determine the reference temperature value. Selection of measured temperatures from weather stations can also be limited to weather stations with altitudes that are within a range of acceptable altitudes (e.g., altitudes within X units of distance from the reference altitude or another altitude, such as a ground-level altitude in the vicinity of the mobile device).

The term "reference data" refers to any of: reference pressure(s) from weather station(s); measured temperature(s) or reference temperature(s) from weather station(s); or other atmospheric data from weather station(s). The term "reference value" refers to any of: reference pressure value(s) determined from reference pressure(s); reference temperature value(s) determined from measured temperature(s) or reference temperature(s); or other reference atmospheric data values determined from atmospheric data collected from weather station(s).

Other Aspects

Discussion above has been generally focused on reference pressures and reference pressure values. However, the approaches can be modified as would be understood by one of ordinary skill in the art to select temperatures for weather stations before using the selected temperatures to determine a reference temperature value for use in the altitude computation that is based on reference temperature(s) from weather station(s). Selection could be based on proximity relative to a cellular element, age, quality or other condition. Similarly, the approaches can be modified as would be understood by one of ordinary skill in the art to select humidity or other atmospheric parameters, or to select any data that is available from weather stations.

Different protocols known in the art for transmitting reference pressure values, reference temperature values, locations of transmitters, etc., are contemplated, including use of system information blocks (SIBs).

Any method (also referred to as a "process" or an "approach") described or otherwise enabled by disclosure herein may be implemented by hardware components (e.g., machines), software modules (e.g., stored in machine-readable media), or a combination thereof. In particular, any method described or otherwise enabled by disclosure herein may be implemented by any concrete and tangible system described herein. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media, including but not limited to one or more non-volatile or volatile storage media, removable or non-removable media, integrated circuit media, magnetic storage media, optical storage media, or any other storage media, including RAM, ROM, and EEPROM, that may be patented under the laws of the jurisdiction in which this application is filed, but does not include machine-readable media that cannot be patented under the laws of the jurisdiction in which this application is filed. Methods disclosed herein provide sets of rules that are performed. Systems that include one or more machines and one or more non-transitory machine-readable media for implementing any method described herein are also contemplated herein. One or more machines that perform or implement, or are configured, operable or adapted to perform or implement operations comprising the steps of any methods described herein are also contemplated herein. Each method described herein that is not prior art represents a specific set of rules in a process flow that provides significant advantages in the field of determining, broadcasting and using reference pressure data in a network of transmitters. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

Figure 12:
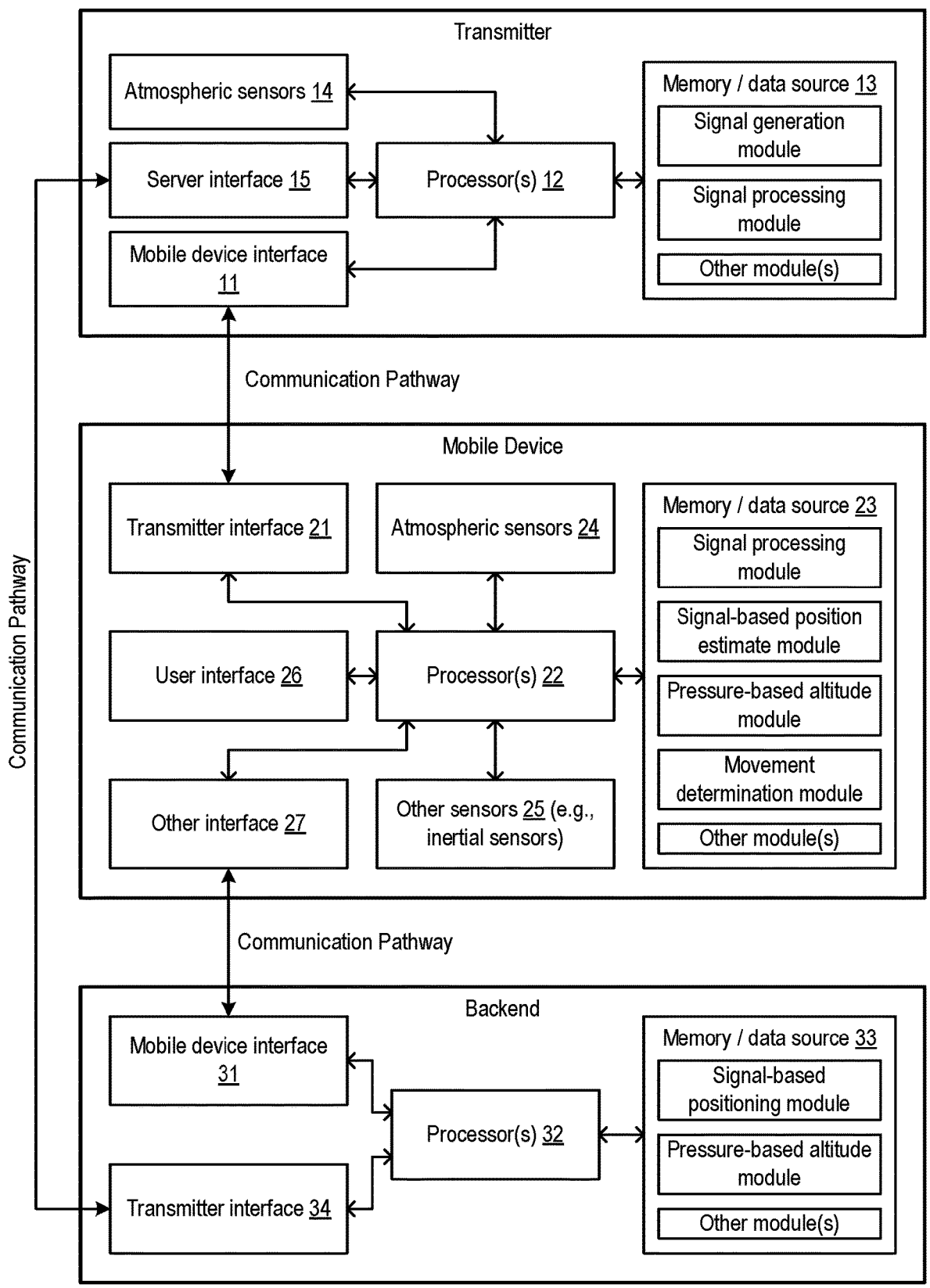
FIG. 12 illustrates components of a transmitter, a mobile device, and a network backend.

FIG. 12 illustrates components of a transmitter, a mobile device, and a server. Examples of communication pathways are shown by arrows between components.

By way of example in FIG. 12, each of the transmitters may include: a mobile device interface 11 for exchanging information with a mobile device (e.g., antenna(s) and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, humidity other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example FIG. 12, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 12, the server may include: a mobile device interface 31 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. Pub. No. 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

This application relates to the following related application(s): U.S. Pat. Appl. No. 62/874,811, filed 2019-07-16, entitled SYSTEMS AND METHODS FOR DETERMINING, BROADCASTING AND USING REFERENCE ATMOSPHERIC DATA IN A NETWORK OF TRANSMITTERS. The content of each of the related application(s) is hereby incorporated by reference herein in its entirety.

The invention claimed is:

1. A method for determining, broadcasting and using reference atmospheric data in a transmitter network, wherein the method comprises:
 selecting reference data from one or more weather stations,
 wherein the reference data includes one or more of a reference pressure the one or more weather stations, or a measured temperature from each of the one or more weather stations;
 using the selected reference data to determine a reference value,
 wherein the reference value includes one or more of a reference pressure value of a reference altitude, or a reference temperature value; and
 transmitting the reference value from a transmitter of the transmitter network to a mobile device;
 wherein the selecting reference data from one or more weather stations within the transmitter network to be used in determining one or more reference values comprises:
 determining a cellular element associated with the transmitter,
 wherein the cellular element is a location of the transmitter, a coverage area of the transmitter, a cell sector of the transmitter, or a beam of the transmitter; and
 selecting reference data that meet a proximity condition relative to the cellular element.

2. The method of claim 1, wherein the method further comprises:
 after transmitting the reference value, determining if a broadcast is scheduled at a first time; and
 if a broadcast is scheduled at the first time:
 selecting new reference data from one or more weather stations within the transmitter network;
 using the new reference data to determine a new reference value; and
 transmitting the new reference value from the transmitter to the mobile device or another mobile device.

3. The method of claim 1, wherein the method further comprises:
 after transmitting the reference value, determining if a broadcast is scheduled at a first time;
 if a broadcast is scheduled at the first time, determining if the reference value is valid;
 if the reference value is valid, transmitting the reference value from the transmitter to the mobile device or another mobile device; and
 if the reference value is not valid:
 generating a new reference pressure value; and
 transmitting the new reference pressure value from the transmitter to the mobile device or the other mobile device.

4. The method of claim 1, wherein the method further comprises:
 after transmitting the reference value, determining if the reference value is valid;
 if the reference value is valid, transmitting the reference value from the transmitter to the mobile device or another mobile device; and
 if the reference value is not valid:
 generating a new reference pressure value; and
 transmitting the new reference pressure value from the transmitter to the mobile device or the other mobile device.

5. The method of claim 1, wherein the method further comprises:
 after transmitting the reference value, determining if a broadcast is scheduled at a first time;
 if a broadcast is not scheduled at the first time, determining if the reference value is valid;

if the reference value is valid, determining if a broadcast is scheduled at a second time that is after the first time; and if the reference value is not valid:
  generating a new reference value; and
  determining if a broadcast is scheduled at the second time.

6. The method of claim 1, wherein selecting reference data that meet a proximity condition relative to the cellular element comprises:

selecting only reference data from each weather station within the cellular element or within a threshold distance from part of the cellular element.

7. The method of claim 1, wherein selecting reference data that meet a proximity condition relative to the cellular element comprises:

selecting only reference data from the nearest n weather stations to part of the cellular element.

8. The method of claim 1, wherein the reference data is selected based on an age or a quality in addition to the proximity condition, and selecting reference data comprises:

selecting only reference data with an age that is below a threshold age value, selecting only the n most-recently provided reference data, selecting only reference data with a quality that is above a threshold quality value, or selecting only the n highest-quality reference data.

9. The method of claim 1, wherein if no reference data meet the proximity condition, the method comprises:

determining a new cellular element; and
selecting reference data that meet the proximity condition relative to the new cellular element.

10. The method of claim 3, wherein the determining if the reference value is valid comprises:

determining a time at which an atmospheric condition in the transmitter network is expected to change by a threshold amount of the atmospheric condition since the reference value was determined, wherein the atmospheric condition is pressure when the reference value is a reference pressure value, or the atmospheric condition is temperature when the reference value is a reference temperature value; and determining, based on the determined time, an expiration time for the reference value before which the reference value is valid and after which the reference value is invalid, wherein the expiration time is the determined time or a time that precedes the determined time by a threshold amount of time.

11. The method of claim 3, wherein the reference value is a reference pressure value, and wherein generating a new reference value comprises:

adjusting the reference pressure value by an amount of pressure change that occurred in the network since the reference pressure value was determined, wherein the new reference pressure value is the result of adjusting the reference pressure value.

12. The method of claim 3 wherein the selected reference data includes selected reference pressures, wherein the reference value is a reference pressure value, and wherein generating a new reference value comprises:

for each reference pressure of the selected reference pressures that originated from an area in which pressure changed in excess of a threshold amount of pressure since that reference pressure was determined, adjusting that reference pressure by an amount of pressure change that occurred since that reference pressure was determined; and computing the new reference pressure value using the adjusted reference pressures.

13. The method of claim 1, wherein the selected reference data includes selected reference pressures, wherein the reference value is a reference pressure value of a reference altitude, and wherein the method further comprises:

receiving, at the mobile device, the reference pressure value that was transmitted by the transmitter;

determining if the reference pressure value is valid at a current time;

if the reference pressure value is valid:
  determining a first representative reference pressure value using the reference pressure value received from the transmitter, and
  using the first representative reference pressure value, the reference altitude, and a pressure value measured by a pressure sensor of the mobile device to estimate an altitude of the mobile device; and if the reference pressure value is not valid:
  determining a new reference pressure value by adjusting the reference pressure value received from the transmitter based on changes in pressure in the network,
  determining a second representative reference pressure value using the new reference pressure value, and
  using the second representative reference pressure value, the reference altitude, and the pressure value to estimate the altitude of the mobile device.

14. The method of claim 13, wherein determining if the reference pressure value is valid comprises:

(i) (a) receiving, from the transmitter, an expiration time of the reference pressure value, and (b) determining that the reference pressure value is valid if the current time is before the expiration time, and determining that the reference pressure value is invalid if the current time is after the expiration time; or (ii) (a) determining a time at which pressure in the network is expected to change by a threshold amount of pressure since the reference pressure value was determined; (b) determining, based on the determined time, an expiration time for the reference pressure value before which the reference pressure value is valid and after which the reference pressure value is invalid, wherein the expiration time is the determined time or a time that precedes the determined time by a threshold amount of time; and (c) determining that the reference pressure value is valid if the current time is before the expiration time, and determining that the reference pressure value is invalid if the current time is after the expiration time.

15. The method of claim 13, wherein determining a first representative reference pressure value comprises:

(i) (a) selecting, from m received reference pressure values, the n most-recently determined reference pressure values, wherein m is greater than n, and wherein the n reference pressure values include the reference pressure value received from the transmitter; and (b) computing the first representative reference pressure value by combining the n selected reference pressures;

(ii) (a) selecting, from m received reference pressure values, the n reference pressure values having the longest validity times, wherein m is greater than n, and wherein the n reference pressure values include the reference pressure value received from the transmitter; and (b) computing the first representative reference pressure value by combining the n selected reference pressures; or (iii) (a) selecting, from m received reference pressure values, the n reference pressure values from n respective transmitters that are closet to an estimated location of the mobile device, wherein m is greater than n, and wherein the n reference pressure values include the reference pressure value received from the transmitter; and (b) computing the first representative reference pressure value by combining the n selected reference pressures.

16. The method of claim 13, wherein determining a new reference pressure value comprises:
   (i) adjusting the reference pressure value by an amount of pressure change that occurred since the reference pressure value was determined, wherein the new reference pressure value is the result of adjusting the reference pressure value;
   (ii) (a) determining an estimated position of the mobile device; (b) determining an expected amount of change in pressure between the estimated position of the mobile device and a previous estimated position of the mobile device at which the reference pressure value was received; and (c) adjusting the reference pressure value by the expected amount of change in pressure, wherein the new reference pressure value is the result of adjusting the reference pressure value; or
   (iii) (a) determining an estimated position of the mobile device; (b) determining an expected amount of change in pressure between the estimated position of the mobile device and the transmitter; and (c) adjusting the reference pressure value by the expected amount of change in pressure, wherein the new reference pressure value is the result of adjusting the reference pressure value.

17. One or more non-transitory machine-readable media embodying program instructions that, when executed by one or more machines, cause the one or more machines to implement the method of claim 1.

* * * * *